Patented Oct. 13, 1925.

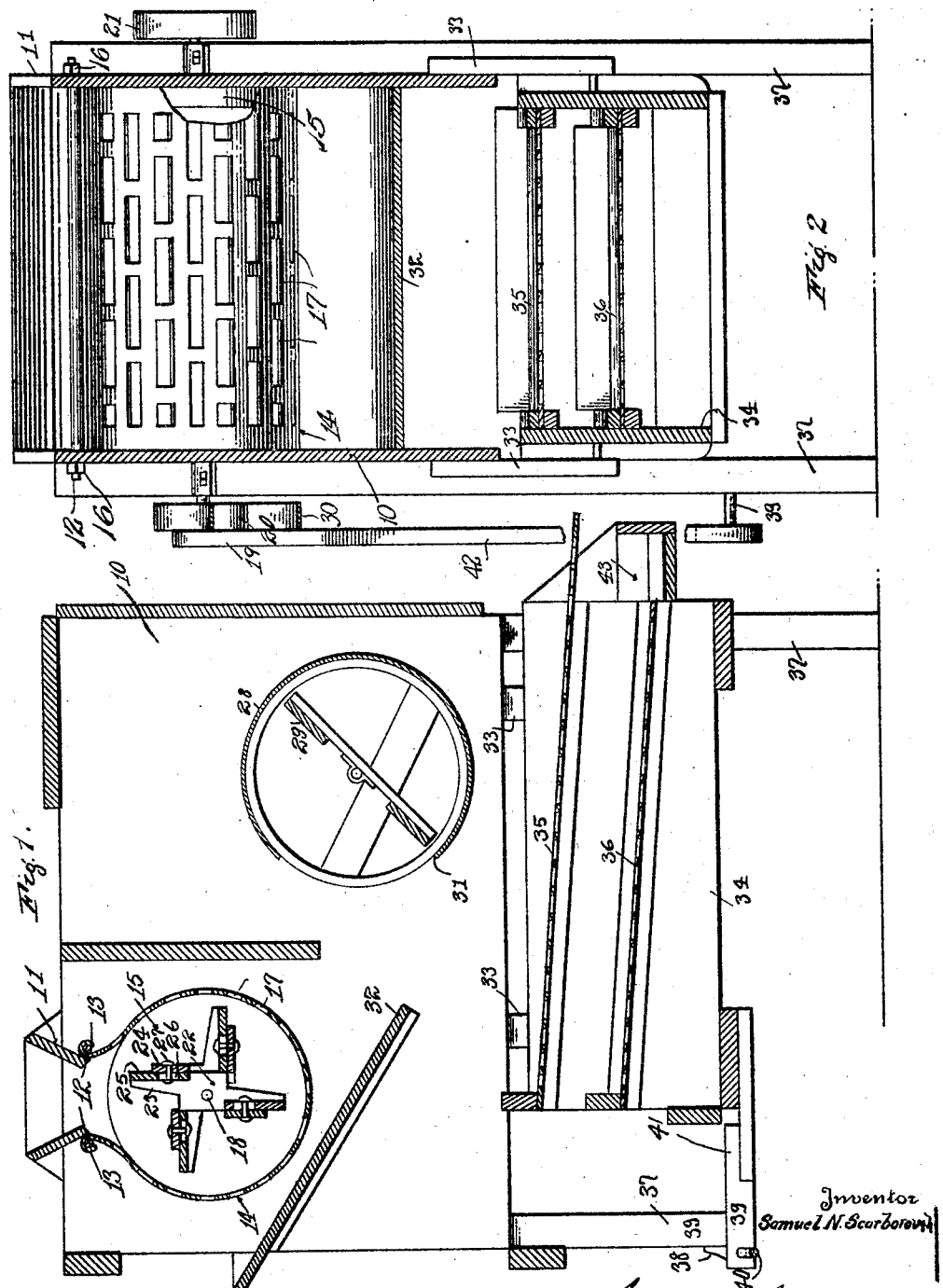

1,557,098

UNITED STATES PATENT OFFICE.

SAMUEL N. SCARBOROUGH, OF HENDERSON, TEXAS.

PEANUT SHELLER.

Application filed April 24, 1924. Serial No. 708,761.

*To all whom it may concern:*

Be it known that I, SAMUEL N. SCARBOROUGH, a citizen of the United States, residing at Henderson, in the county of Rusk, State of Texas, have invented certain new and useful Improvements in Peanut Shellers; and I do hereby declare the following to be a full, clear, and exact description of the invention, such as will enable others skilled in the art to which it appertains to make and use the same.

This invention relates to new and useful improvements in shelling machines, and particularly to machines for shelling peanuts.

One object of the invention is to improve the construction of the cylinder and concave, or drum and beater, whereby the breaking of the shells of the peanuts is accomplished in a more efficient manner than heretofore, and with the minimum breakage of the kernels.

Another object is to provide a beater wherein the blades are adjustable to compensate for the wear on the ends thereof.

Another object is to provide a drum which is readily removable and reversible, to permit the effective use of one side thereof, when the other side has become worn.

Other objects and advantages will be apparent from the following description when taken in connection with the accompanying drawings.

In the drawings:

Figure 1 is a vertical longitudinal central sectional view through a peanut sheller made in accordance with the present invention.

Figure 2 is a vertical transverse sectional view showing the construction of the beater.

Referring particularly to the accompanying drawings, 10 represents the housing or casing of the machine, on the upper side of which, adjacent one end, is mounted a hopper 11. Extending transversely of the housing 10, below the hopper, and having their ends disposed through the opposite side walls of the housing, are the removable rods 12 which extend through the tubular ends 13, of a sheet metal drum 14, said drum being engaged, at its opposite ends, around the pair of circular disks 15, which are secured to the inner faces of the said side walls of the housing. The opposite ends of the rods 12 are threaded and have the nuts 16 engaged thereon. Formed in the drum 14, longitudinally thereof, are the elongated openings 17. Disposed longitudinally and centrally through the drum 14, and having its ends journaled in the side walls of the housing 10, is the beater shaft 18, one end of said shaft, externally of one of the side walls, being provided with the double pulley construction 19—20, while the other end is provided with the main drive pulley 21, which receives power from any suitable source. Secured on each end of the shaft 18, inwardly of the disks 15, is a collar 22 having formed thereon the radial arms 23. Extending longitudinally of the shaft 18, and having the opposite ends secured to corresponding radial arms 23, are the bars 24. Secured to each of the bars 24, and having their outer ends projecting beyond the outer longer edge of the bar, are the blades or beater arms 25, said blades or arms being formed with longitudinal slots 26, which receive bolts 27, also engaged through the bars 24, whereby said blades are capable of adjustment radially of the beater, and into closer or more remote relation to the slotted drum 14. Normally these blades 25 are in their innermost positions on the bars 24, and as their outer ends wear away, the blades are adjusted outwardly, as will be readily understood.

In the lower portion of the other end of the housing is the fan housing 28, in which is rotatably disposed the fan 29, driven by the belt 30, from the shaft 18. The outlet 31 of the housing 28 is directed toward and below the slotted drum 14, an inclined board 32 being mounted in the housing 10, and extending downwardly and inwardly toward the discharge of the fan housing, in the path of the falling shells and kernels of the nuts, as they are discharged from the drum 14. Supported on the lower portion of the housing 10, by the hangers 33, is a frame 34, and disposed in superimposed and spaced relation in this frame, are the screen plates 35 and 36. The housing 10 is supported by suitable legs 37, and mounted in bearings 38, carried by the lower portions of the legs at the beater end of the housing, is a shaft 39, said shaft having a central crank 40 to which is connected one end of a pitman rod 41, carried by the said frame 34, and whereby said frame is adapted to be reciprocated. Driving power is transmitted to the shaft 39, from the shaft 18, by means of the belt 42. Extending transversely of the device, and mounted on the lower portions of the legs 37, at the other end of the housing, is a trough 43, which inclines downwardly toward one side of the housing. The adjacent end of the lower plate 36 overlies, and projects into the trough to deliver thereto the kernels which have passed through the plate 35, while the upper plate 35 has its corresponding end projecting across and beyond the outer side of the trough for the purpose of delivering the broken hulls or shells, and the unbroken smaller peanuts, to a suitable receptacle, not shown.

It will, of course, be understood that as the peanuts are fed into the hopper they fall into the interior of the drum 14, where they are violently thrown against the interior of the drum. This action of the beater produces the breaking of the shells of the peanuts and the freeing of the kernels therefrom, such broken shells and kernels falling through the slots of the drum onto the upper shaking screen plate 35, and passing through the openings of said plate onto the lower plate 36, from whence they are delivered to the trough 43, the smaller parts of the shells being blown by the fan against the inclined board 32 and thence out of the machine. The larger portions of the broken shells pass along the plate 35, and across the trough into the receptacle placed to receive them.

It will be understood that, as the beater rotates in one direction, constantly, the wearing action against one longer wall of each of the slots of the drum 14, will cause such wall to become worn, resulting in the improper coaction between the blades 25 and said slot walls. Ordinarily the drum would be removed and a new one substituted, but in the present case the drum is removed by withdrawing the rods 12, reversing the drum, and replacing the same in the housing 10. This reversal of the drum 14 presents the other longer walls of the slots in position for cooperation with the beater arms 25, thus doubling the length of time such drum may be effectively used, as well as reducing the cost of operation by one-half. Also, the beater arms 25 will successfully operate for a longer period of time, due to the fact that they are extensible, to compensate for the wearing away of their operating ends.

The blades 25 being in the form of comparatively broad plates will prevent the too rapid discharge of peanuts from the hopper, into the drum 14, their action being to exert an upward pushing force against the peanuts tending to drive them back into the hopper. Thus the flow of peanuts is constant, and crowding prevented.

What is claimed is:

1. In a peanut sheller, the combination with a housing, of disks mounted on the housing, a drum comprising a metal sheet having openings therein and engaged with its marginal edge portions around said disks and having its ends in closely spaced parallel relation, and means removably engaged through the housing and removably engaged through said sheet ends whereby said drum is removable and reversible.

2. In a peanut sheller, the combination with a housing, of circular disks carried by the opposite inner faces of the housing a metal drum having its end portions encircling said circular disks and extending from one side of the housing to the other side thereof, the longer edges of the drum being disposed in closely spaced parallel relation and rolled into tubular formation, and removable rods disposed through the housing and said tubular portions adjacent the peripheries of the disks whereby said drum is rendered removable and reversible.

In testimony whereof, I affix my signature.

SAMUEL N. SCARBOROUGH.